United States Patent [19]

McKeown et al.

[11] Patent Number: 5,086,568
[45] Date of Patent: Feb. 11, 1992

[54] GEOLOGICAL GYROCOMPASS

[75] Inventors: Mark H. McKeown, Golden; Steven C. Beason, Lakewood, both of Colo.

[73] Assignee: The United States of America as represented by the Secretary of the Interior, Washington, D.C.

[21] Appl. No.: 602,598

[22] Filed: Oct. 24, 1990

Related U.S. Application Data

[63] Continuation-in-part of Ser. No. 231,017, Aug. 11, 1988, abandoned.

[51] Int. Cl.$^5$ .................. G01C 19/38; G01C 1/02
[52] U.S. Cl. .................. 33/275 G; 33/324; 33/1 E
[58] Field of Search .................. 33/275 R, 275 G, 324, 33/1 E, 328, 327, 329

[56] References Cited

U.S. PATENT DOCUMENTS

| | | | |
|---|---|---|---|
| 1,926,251 | 9/1933 | Mayrhauser | 33/275 G |
| 2,519,191 | 8/1950 | Jassy | 33/275 G |
| 3,172,213 | 3/1965 | Eklund | 33/275 G |
| 3,229,376 | 1/1966 | Wilcox | 33/275 G |
| 3,283,408 | 11/1966 | Rothe et al. | 33/275 G |
| 3,283,409 | 11/1966 | Rothe et al. | 33/275 G |
| 3,373,499 | 3/1968 | Rothe et al. | 33/275 G |
| 3,417,474 | 12/1968 | Evans et al. | 33/275 G |
| 3,525,159 | 8/1970 | Mills | 33/328 |
| 4,033,045 | 7/1977 | Wing | 33/275 G |
| 4,109,391 | 8/1978 | Wing | 33/275 G |

Primary Examiner—William A. Cuchlinski, Jr.
Assistant Examiner—William C. Dowling
Attorney, Agent, or Firm—E. Philip Koltos

[57] ABSTRACT

The geological gyrocompass is an accurate, portable instrument useful for geologic mapping and surveying which employs an aircraft gyrocompass, strike reference bars, a pair of sights and leveling devices for horizontally leveling the instrument. A clinometer graduated in degrees indicates the dip of the surface being measured.

5 Claims, 2 Drawing Sheets

GEOLOGICAL GYROCOMPASS

STATEMENT OF GOVERNMENT INTEREST

The invention described herein was made by employees of the U.S. Government and may be manufactured and used by or for the Government for Governmental purposes without the payment of any royalties thereon or therefore.

RELATED PATENT APPLICATION

This is a continuation-in-part of U.S. Pat. application Ser. No. 07/231,017, filed Aug. 11, 1988, the disclosures of which are incorporated by reference.

BACKGROUND OF THE INVENTION

This invention relates to a new and improved geologic mapping and surveying apparatus for providing accurate, dependable and portable measurement of attitudes of planar surfaces in situations where magnetic compasses will not work.

The conventional, portable magnetic compass has several shortcomings inherent in its principle of operation. Every such instrument senses the earth's magnetic field lines by means of a magnetic element that orients itself to such lines. However, in certain environments, as for example, underground, where steel structures and magnetic rock may be found, a magnetic compass will not work. The standard of accuracy for magnetic compasses is the Bruton magnetic compass. However, a magnetic compass requires an environment where the earth's magnetic field is not severely interdicted by local influences.

Prior art devices such as described in U.S. Pat. No. 3,373,499, to Rothe et al and U.S. Pat. No. 4,033,045 to Wing et al, although utilizing gyroscopes for determining direction, utilize pendulous floated gyroscopes. The patent to Wing et al specifically excludes the use of gyroscopic instruments presently used on aircraft. Furthermore, the devices disclosed by the prior art require a long settling time before being capable of use. Other previously known methods of obtaining bearings where magnetic compasses are not appropriate consist of physically comparing the unknown directions to known directions by geometric relationships. This method is slow, tedious and therefore an expensive procedure.

The present invention provides a unique arrangement of the gyrocompass and power supply in a portable carrying case. A gyroscope is not dependent on the earth's magnetic field for a reference as is a magnetic compass. The present invention of a geological gyrocompass therefore is immune to disturbances in the earth's magnetic field and nearly duplicates the Brunton compass accuracy but does not require an environment free of magnetic anomalies.

SUMMARY OF THE INVENTION

It is an objective of the invention to incorporate gyroscope principles in an easily operable instrument for measurement of the attitude of geologic features in environments where magnetic compasses and instruments will not perform or are inaccurate or unreliable.

Further it is an objective of the invention to provide a portable geologic mapping and surveying instrument for accurate measurement of compass directions.

It is an objective to provide a portable geologic mapping and surveying instrument capable of providing accurate measurement of direction in environments where magnetic instruments will not work accurately or dependably.

A still further objective of the invention is to provide a portable geologic mapping and surveying instrument capable of providing accurate measurement of direction in underground facilities.

These and other objectives of the invention and the various features and details of construction and operation will become apparent from the specification and drawing.

This is accomplished in accordance with the present invention by providing a gyrocompass, horizontally leveling means and a clinometer graduated in degrees. The gyrocompass, preferably an aircraft directional gyrocompass, is powered by a portable power supply.

DESCRIPTION OF THE PREFERRED EMBODIMENT

Figure 1:
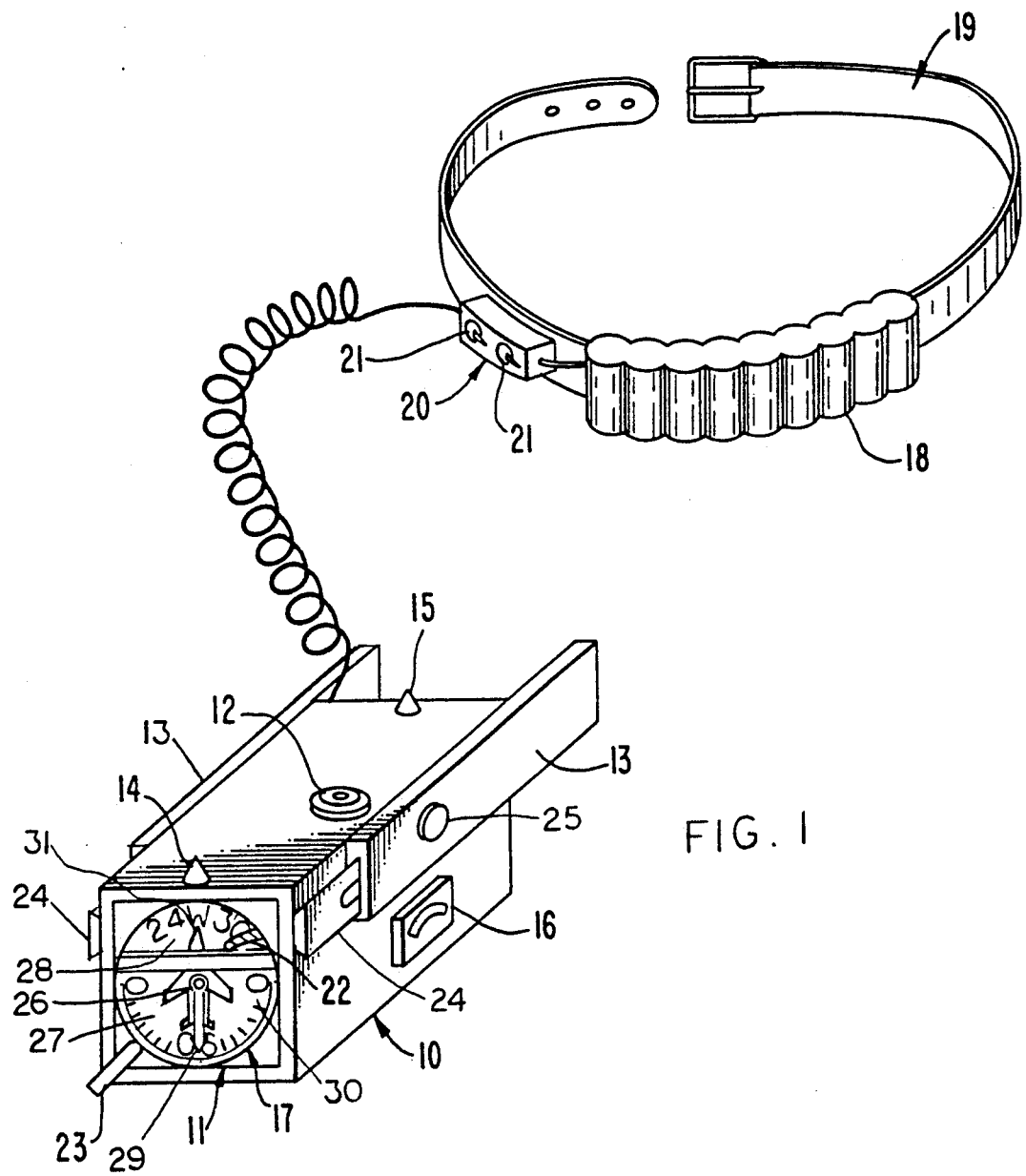
FIG. 1 shows a view of a geological gyrocompass of the present invention.
Figure 3:
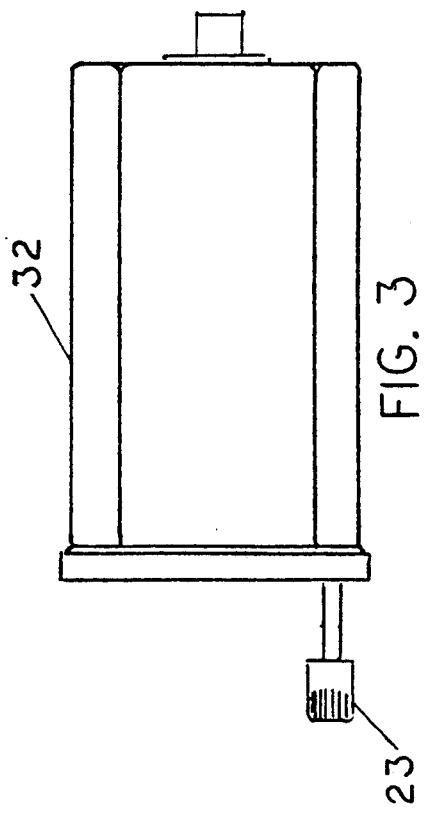
FIG. 3 shows a side view of a directional gyrocompass.
Figure 4:
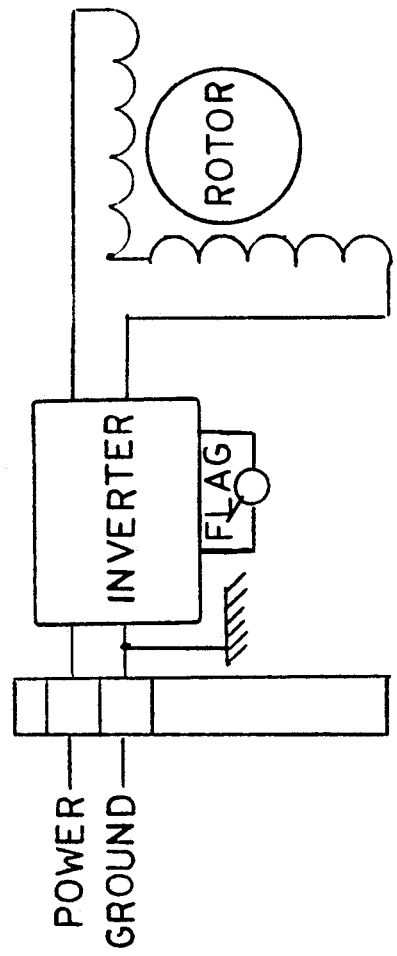
FIG. 4 shows a schematic of a power supply.
Figure 2:
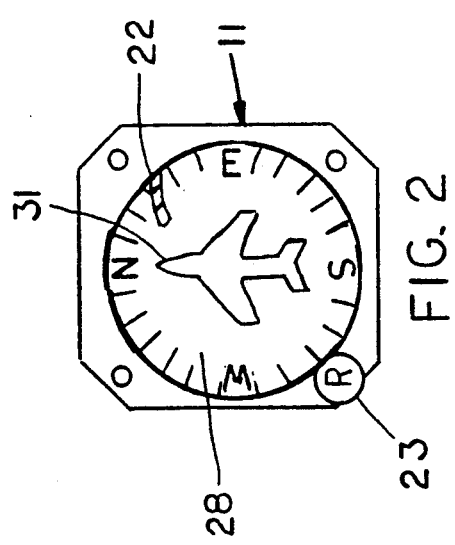
FIG. 2 shows a front view of a directional gyrocompass.

FIG. 1 illustrates one form of the novel apparatus, showing its general appearances when set up for use in the field. FIGS. 2 through 4 show details of the aircraft gyrocompass 11. It is seen that the invention includes supporting means such as shock resistant case 10 which serves as a base or support for an aircraft or other gyrocompass and additional features described below. The aircraft gyroscope 11 is equipped from the factory with an anodized dust case 32 to keep out dust and humidity. In a preferred embodiment of the invention, a directional gyro, Model No. 205, manufactured by Castleberry Instruments and Avionics, Austin, Tex. was used. The dust case 32 is shock mounted within an outer case 10 by means of four rubber grommets through which four mounting screws (not shown) are secured. These mounting screws position the gyroscope within the outer case 10. Several foam rubber pads within the outer case 10 serve to further support and isolate the gyroscope 11 from shock. The dust case 32 does not contact the outer case 10 other than through shock mounts. This mounting serves to protect the gyroscope mechanism from jolts and minor impacts.

Additionally, the shock resistant case 10 of the instrument is provided with a bull's-eye level 12 for enabling the operator to level case 10 when measuring strikes. For purposes of this invention, a strike is the orientation of the intersection of a geologic feature with a horizontal plane. The case 10 may have one or two strike reference bars 13 and a pair of target sights 14 and 15. The strike reference bars 13 are rectangular metal bars which can be extended beyond the rear of the gyrocompass case. The bars 13 are mounted on sliding dovetails 24 which allow the bars to be extended parallel to the case to assist in measuring the bearing or strike of rock surfaces which cannot be measured by visually aligning the gyrocompass. To use the strike bar 13, the retaining knob 25 is loosened, the bar 13 is extended as far as possible, and the knob 25 is re-tightened The long edge of the bar 13 is then placed flat against the surface to be measured while the gyrocompass is maintained in a level position. The strike of the surface is then read from the dial 28 on the front of the instrument. In addition, a standard level 16 may be added for horizontally leveling the instrument.

A clinometer 17 is mounted on a front escutcheon 26. The clinometer 17 displays the inclination of the sides of the gyrocompass. The clinometer 17 consists of a pendulum-type pointer arm 29 on a pivot within a fluid-filled chamber. The fluid within the chamber provides dampening for the pointer arm 29. A degree scale 30 is imprinted on the face of the clinometer 17 reading from 0° to 90° to 0° in single degree increments. The operator can measure the dip angle from horizontal of planar geologic features by rotating the instrument about the long horizontal axis until one of the vertical sides of the instrument is visually parallel to the geologic surface being measured. The dip of the geologic feature can then be read directly from the degree scale 30.

The geological gyrocompass 11 is powered by a rechargeable battery pack 18. The battery pack 18 may be attached to a belt 19 which is worn around the waist of an operator (not shown). Also attached to the belt 19 is a switch box 20 equipped with power control switches 21 and an appropriately sized fuse (not shown). The condition of the battery pack 18 may be seen on power warning indicator 22 located on the face 27 of gyrocompass 11. The gyrocompass 11 may be readily set or reset by turning setting knob 23 also located on the face of gyrocompass 11.

The resetting knob 23 is used for both initial orientation of the gyrocompass after "power up" and for resetting the orientation of the gyrocompass. Three to five minutes are required to reach full operating speed. After the unit has reached full speed, one side of the instrument case is aligned with a known reference, the reference knob 23 is depressed and turned until the dial on the gyrocompass face 27 indicates the known bearing. The reset knob 23 is also used to re-set the gyrocompass after a period of time to compensate for drift within the instrument. Resetting is done by returning the instrument to the original position or other reference of known bearing. The side of the instrument is placed along the reference and the reset knob 23 is pushed in and turned until the main dial of the instrument reads the same as the bearing.

SYSTEM OPERATION

The geological gyrocompass of the invention is initially set to a known direction. When measuring strikes, the instrument is leveled while simultaneously aligning the instrument, utilizing the sights 14 and 15 or the strike reference bar 13 along a plane.

Dip or inclination is measured by rotating the case 10 until it is parallel to the geologic feature to be measured and the dip or inclination is then read from the scale of clinometer 17. The indicating needle of the clinometer 17 remains vertical and the scale moves with the gyrocompass 11.

The orientation of geologic features is measured by visually leveling and then aligning the instrument with the feature. When the instrument is rotated about a vertical axis, the dial rotates to indicate the azimuthal bearing of the sides of the instrument. The bearing is indicated by a pointer 31 mounted on a glass plate immediately in front of the rotating dial 28. The operator visually sights along the sights 14 and 15 or one of the upper corners of the instrument with the strike of the geologic feature, i.e., the intersection of a planer feature with an imaginary horizontal plane. This alignment is done while maintaining the instrument in a level position using levels 12 or 16. The bearing indicated on the dial 27 is the strike of the geologic feature. Leveling is not necessary for measuring bearings except in the case of measuring strikes.

The instrument is reset with setting knob 23 as necessary to indicate the reference direction.

While the invention has been described in its preferred embodiment, it is understood that the words which have been used are words of description rather than limitation and that changes may be made within the purview of the appended claims without departing from the true scope and spirit of the invention in its broader aspects.

What is claimed is:

1. A hand held geologic mapping and surveying instrument for providing accurate, dependable, and portable measurement of attitudes of planar surfaces in situations where magnetic compasses will not work, the invention comprising:
   support means,
   gyrocompass means enclosed in a protective case and shock mounted within said support means, said gyrocompass means having numerical readout means for determining direction, and power means adapted to provide power for spinning said gyrocompass means,
   sighting means, comprising at least one strike reference bar and a pair of sights, affixed to said support means for aligning said instrument along a plane of a structure to be measured,
   inclination measuring means affixed to said support means for measuring angles from horizontal, and
   leveling means affixed to said support means for horizontally leveling said instrument to a reference direction.

2. Apparatus as claimed in claim 1, wherein said gyrocompass means comprises an aircraft gyrocompass.

3. Apparatus as claimed in claim 2, wherein said sighting means consists of at least two strike reference bars.

4. A hand held geologic mapping and surveying instrument for providing accurate, dependable, and portable measurement of attitudes of planar surfaces in situations where magnetic compasses will not work, the invention comprising:
   an outer case,
   gyrocompass means enclosed in a protective case and shock mounted within said outer case, said gyrocompass means having numerical readout means for determining direction, and power means adapted to provide power for spinning said gyrocompass means,
   at least one strike reference bar and a pair of sights for aligning said instrument along a plane of a structure to be measured,
   inclination measuring means affixed to said support means for measuring angles from horizontal, and
   leveling means affixed to said support means for horizontally leveling said instrument to a reference direction.

5. Apparatus as claimed in claim 4, wherein said sighting means consists of at least two strike reference bars.

* * * * *